United States Patent
Han et al.

(10) Patent No.: US 10,678,386 B2
(45) Date of Patent: Jun. 9, 2020

(54) DISPLAY APPARATUS AND METHOD FOR IMPLEMENTING TOUCH FEEDBACK

(71) Applicant: BOE TECHNOLOGY GROUP CO., LTD., Beijing (CN)

(72) Inventors: Yanling Han, Beijing (CN); Xue Dong, Beijing (CN); Jing Lv, Beijing (CN); Haisheng Wang, Beijing (CN); Chun-Wei Wu, Beijing (CN); Xiaoliang Ding, Beijing (CN); Pengpeng Wang, Beijing (CN); Xueyou Cao, Beijing (CN); Wei Liu, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/746,292

(22) PCT Filed: Aug. 9, 2017

(86) PCT No.: PCT/CN2017/096618
§ 371 (c)(1),
(2) Date: Jan. 19, 2018

(87) PCT Pub. No.: WO2018/126683
PCT Pub. Date: Jul. 12, 2018

(65) Prior Publication Data
US 2018/0335866 A1    Nov. 22, 2018

(30) Foreign Application Priority Data

Jan. 3, 2017 (CN) .......................... 2017 1 0001557

(51) Int. Cl.
*G06F 3/044* (2006.01)
*G06F 3/041* (2006.01)
*G06F 3/01* (2006.01)

(52) U.S. Cl.
CPC .............. *G06F 3/044* (2013.01); *G06F 3/016* (2013.01); *G06F 3/041* (2013.01); *G06F 3/0412* (2013.01); *G06F 2203/014* (2013.01)

(58) Field of Classification Search
CPC ...... G06F 3/0412; G06F 3/044; G06F 3/0443; G06F 3/0445
(Continued)

(56) References Cited

U.S. PATENT DOCUMENTS

| 2010/0231540 A1* | 9/2010 | Cruz-Hernandez ..... G06F 3/017 345/173 |
| 2013/0057509 A1* | 3/2013 | Cruz-Hernandez ..... G06F 3/044 345/174 |

(Continued)

FOREIGN PATENT DOCUMENTS

| CN | 102662477 A | 9/2012 |
| CN | 104035561 A | 9/2014 |

(Continued)

OTHER PUBLICATIONS

Machine translation of WO 2015188475 (Year: 2018).*

(Continued)

*Primary Examiner* — Michael Pervan
(74) *Attorney, Agent, or Firm* — Dave Law Group LLC; Raj S. Dave

(57) ABSTRACT

The present disclosure provides a display apparatus and a method for implementing a touch feedback. The display apparatus comprises: a display unit configured to display an image; a control unit configured to determine a touched object in the image according to a touch position of a user, (Continued)

and provide voltage signals based on attribute information of the touched object; and a touch unit configured to generate an induced capacitance and an electrostatic force at the touch position based on the voltage signals from the control unit. The display apparatus according to the present disclosure can improve the user experiences in using a terminal device comprising the display apparatus.

8 Claims, 4 Drawing Sheets

(58) Field of Classification Search
USPC .................. 178/18.01–19.07; 345/173–178
See application file for complete search history.

(56) References Cited

U.S. PATENT DOCUMENTS

| | | | |
|---|---|---|---|
| 2014/0055377 A1 | 2/2014 | Kim | |
| 2015/0042598 A1* | 2/2015 | Chae | G06F 3/041 |
| | | | 345/174 |
| 2015/0323995 A1* | 11/2015 | Lim | G06F 3/0416 |
| | | | 345/174 |
| 2016/0048207 A1* | 2/2016 | van der Avoort | G06F 3/016 |
| | | | 345/174 |

FOREIGN PATENT DOCUMENTS

| | | |
|---|---|---|
| CN | 105204687 A | 12/2015 |
| CN | 105373277 A | 3/2016 |
| CN | 105892762 A | 8/2016 |
| CN | 105912183 A | 8/2016 |
| CN | 106200929 A | 12/2016 |
| CN | 106843615 A | 6/2017 |
| WO | WO-2015188475 A1 * | 12/2015 ............... G06F 3/01 |

OTHER PUBLICATIONS

Machine translation of CN 102662477 (Year: 2018).*
International Search Report from PCT Application No. PCT/CN2017/096618 dated Oct. 26, 2017 (5 pages).
Written Opinion from PCT Application No. PCT/CN2017/096618 dated Oct. 26, 2017 (5 pages).
Office Action from Chinese Application No. 201710001557.0 dated Feb. 26, 2019 (11 pages).

* cited by examiner

DISPLAY APPARATUS AND METHOD FOR IMPLEMENTING TOUCH FEEDBACK

This application claims the benefit and priority of Chinese Patent Application No. 201710001557.0 filed on Jan. 3, 2017, the entire disclosure of which is incorporated by reference herein.

TECHNICAL FIELD

The present disclosure relates to the field of display techniques, and particularly, to a display apparatus and a method for implementing touch feedback.

BACKGROUND

With the development of communication techniques, terminal devices (such as mobile phones, tablets, computers and the like) having display functions are continuously intellectualized. Users experience convenient operation through the terminal devices. In the application of a touch screen on the terminal device, physical keys of the terminal device are replaced by virtual keys. When a user performs page switching and function selection through touch operations, the virtual keys can efficiently implement the operations on the terminal device.

Although the virtual keys can realize efficient operations on the terminal device, they lose physical feedbacks when pressed during the operation. In order to improve the user's operation experience when using the virtual keys, some designers of the terminal device use additional settings such as vibration and sound to improve the user experiences.

In the above operation with respect to the virtual keys, although physical feedbacks can be obtained at a certain extent when vibration and sound are used to improve the user experiences, those physical feedbacks provided in this way are usually simplex. In addition, vibration and sound easily cause a power consumption of the terminal device. Thus, the additional settings such as vibration and sound, etc are often turned off by the user.

SUMMARY

The subject matters detailedly described in the present disclosure are summarized as follows. The summary does not intend to limit the protection scope of the claims.

The embodiments of the present disclosure provide a display apparatus and a method for implementing a touch feedback, which can improve the user experiences in using a terminal device comprising the display apparatus.

According to an aspect of the present disclosure, a display apparatus is provided, comprising: a display unit configured to display an image; a control unit configured to determine a touched object in the image according to a touch position of a user, and provide voltage signals based on attribute information of the touched object; and a touch unit configured to generate an induced capacitance and an electrostatic force at the touch position based on the voltage signals from the control unit.

In the embodiment of the present disclosure, the attribute information comprises hardness and/or roughness of an object.

In the embodiment of the present disclosure, the display unit is an organic light emitting diode display unit.

In the embodiment of the present disclosure, the touch unit comprises first electrodes and second electrodes.

In the embodiment of the present disclosure, the touch unit is disposed on a thin film encapsulation layer of the display unit.

In the embodiment of the present disclosure, the touch unit comprises: a first electrode layer comprising a plurality of first electrodes; a second electrode layer comprising a plurality of second electrodes; and an insulation layer disposed between the first electrode layer and the second electrode layer; or, the touch unit comprises a plurality of first electrodes and a plurality of second electrodes disposed in a same layer.

In the embodiment of the present disclosure, the touch unit is disposed in a thin film encapsulation layer of the display unit.

In the embodiment of the present disclosure, the touch unit comprises: a first electrode layer disposed on a first water blocking layer of the thin film encapsulation layer and comprising a plurality of first electrodes; an insulation layer disposed on the first electrode layer; and a second electrode layer disposed on the insulation layer and comprising a plurality of second electrodes; wherein a second water blocking layer of the thin film encapsulation layer is disposed on the second electrode layer, and the insulation layer is a planarization layer of the thin film encapsulation layer.

In the embodiment of the present disclosure, the voltage signals comprise a first voltage signal provided to the first electrode in the touch unit, and a second voltage signal provided to the second electrode in the touch unit.

In the embodiment of the present disclosure, the touch unit is configured to generate the induced capacitance and the electrostatic force based on the first voltage signal and the second voltage signal at the touch position.

In the embodiment of the present disclosure, the display apparatus further comprises a storage unit configured to store attribute information of an object and a corresponding voltage signal in association; wherein the control unit is further configured to acquire a voltage signal corresponding to the determined touched object from the storage unit.

According to another aspect of the present disclosure, a method for implementing a touch feedback is provided, comprising: determining a touched object in a displayed image according to a touch position of a user; providing voltage signals based on attribute information of the touched object; and generating an induced capacitance and an electrostatic force at the touch position based on the voltage signals.

In the embodiment of the present disclosure, the attribute information comprises hardness and/or roughness of an object.

In the embodiment of the present disclosure, the voltage signals comprise a first voltage signal and a second voltage signal.

In the embodiment of the present disclosure, the method further comprises storing attribute information of an object and a corresponding voltage signal in association.

According to the embodiments of the present disclosure, the display apparatus can generate the required electrostatic force at the touch position of the user based on the attribute information of the touched object. Thus, the user can acquire the tactile sense of the object at the touch position, thereby improving the user experiences in using the terminal device.

Other characteristics and advantages of the present disclosure will be set forth in the subsequent description, and become partially obvious from the specification, or be acquired by implementing the present disclosure. The objective and other advantages of the present disclosure can be implemented and obtained through the structures particularly pointed out in the specification, claims and drawings.

BRIEF DESCRIPTION OF DRAWINGS

The drawings are used to provide a further understanding of the technical solutions of the present disclosure, and constitute a part of the specification to explain the technical solutions of the present disclosure together with the embodiments, without limiting the technical solutions of the present disclosure.

DETAILED DESCRIPTION

Figure 1:
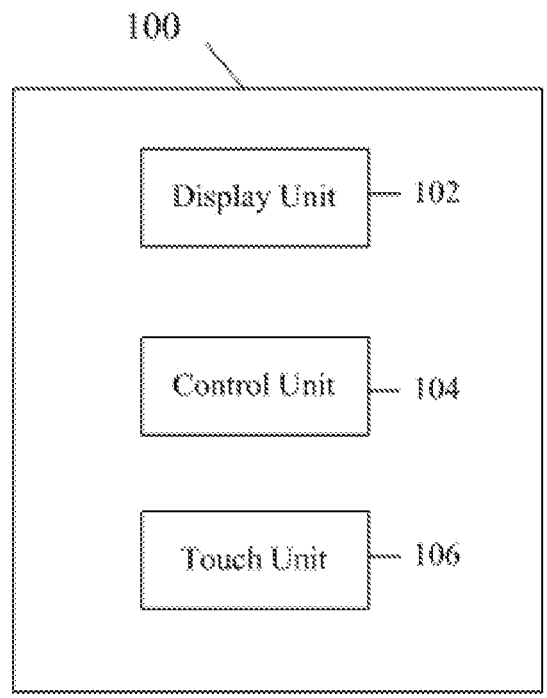
FIG. 1 shows a schematic block diagram of a display apparatus according to an embodiment of the present disclosure.

In order to make the objectives, technical solutions and advantages of the present disclosure clearly, the embodiments of the present disclosure will be described in details as follows with reference to the drawings. It should be noted that, in the case of no conflict, the embodiments in this application and the features in the embodiments can be combined with each other arbitrarily.

In the description of the present disclosure, the direction or position relationship indicated by terms "on", "over", "under", "below", "between", etc. are based on the direction or position relationship in the drawings. It is only to simplify the description, but not to indicate or imply that the apparatus or elements must have specific direction or are constructed or operated in a specific direction. They should not be understood as limitation of the disclosure. In addition, when an element or a layer is referred to as being "on" another element or layer, it may be directly on the other element or layer, or there may be at least one intermediate element or layer between them. Similarly, when an element or a layer is referred to as being "under" another element or layer, it may be directly under the other element or layer, or there may be at least one intermediate element or layer between them. When an element or a layer is referred to as being "between" two elements or layers, it may be an only element or layer between the two elements or layers, or there may be at least one intermediate element or layer between them.

The steps shown in the flow diagram may be performed in a computer system, such as a group of computer executable instructions. In addition, the flow diagram described in the present disclosure is just an example. There may be many modifications to the flow diagram or the steps described therein without deviating from the spirit of the present disclosure. For example, those steps may be performed in different orders, or the steps may be added, deleted, or modified. Those modifications are deemed as parts of the claimed aspects.

Unless the context clearly indicates otherwise, the singular form of a term used herein and the appended claims includes the plural form, and vice versa. Thus, when a term is referred to the singular form, it usually includes the plural form. Similarly, the terms "including", "comprising", "containing", "having" and their grammatical variations are intended to be inclusive and mean that there may be additional elements other than the listed elements. When the term "example" is used herein, particularly when it is positioned after a group of terms, the "example" is merely exemplary and illustrative, and should not be deemed as exclusive or universal. The terms "first", "second", "third" and the like are just used for the purpose of description, and should not be understood as indicating or implying any relative importance or formation sequence.

FIG. 1 shows a schematic block diagram of a display apparatus 100 according to an embodiment of the present disclosure. As shown in FIG. 1, the display apparatus 100 may comprise a display unit 102, a control unit 104 and a touch unit 106.

The display unit 102 may be configured to display an image. In the embodiment of the present disclosure, the display unit 102 may comprise an Organic Light Emitting Diode (OLED) display unit. It should be appreciated that the OLED display unit may further comprise other types of display units implemented based on the OLED display principle.

The control unit 104 may be configured to determine a touched object in the displayed image according to a touch position of the user, and provide a voltage signal based on attribute information of the touched object.

In the embodiment of the present disclosure, when displaying an image in the display unit 102, the control unit 104 may recognize each object in the displayed image, and acquire a position of each object. The recognition of object can be realized through the existed image recognition techniques. When the user touches the display apparatus 100, the control unit 104 may acquire the touch position of the user, and determine the touched object according to the touch position.

Further, the control unit 104 may determine attribute information of the touched object, and acquire a voltage signal corresponding to the attribute information. The control unit 104 may then provide the voltage signal to the touch unit 106. The voltage signal may comprise a first voltage signal and a second voltage signal, which for example may be difference frequency voltage signals. When touching a real object, the user can acquire a tactile sense from at least one of hardness and roughness of the object. Therefore, the attribute information may comprise at least one of hardness and roughness of the object.

The touch unit 106 is configured to generate an induced capacitance and an electrostatic force at the touch position based on the voltage signal from the control unit 104. In the embodiment of the present disclosure, the touch unit 106 may be capacitive, and disposed on or in a thin film encapsulation layer of the display unit 102. The touch unit 106 may comprise a plurality of first electrodes as transmitting electrodes, and a plurality of second electrodes as receiving electrodes. The first electrodes and the second electrodes may be disposed in different layers or in the same layer, for example as shown in FIGS. 2 and 3.

Figure 2:
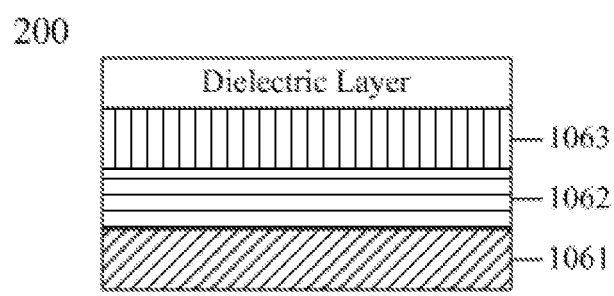
FIG. 2 shows a cross-section view of a touch unit in a display apparatus according to an embodiment of the present disclosure.
Figure 3:
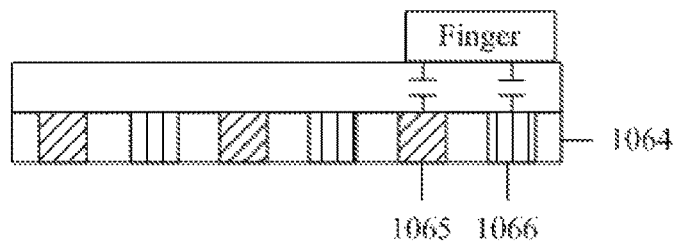
FIG. 3 shows a cross-section view of a touch unit according to another embodiment of the present disclosure.

FIGS. 2 and 3 respectively show cross-section views of a touch unit 200 and a touch unit 300 according to the embodiments of the present disclosure. In an example embodiment, as shown in FIG. 2, the touch unit 200 may comprise a first electrode layer 1061, a second electrode layer 1063 and an insulation layer 1062 disposed between the first electrode layer 1061 and the second electrode layer 1063. The first electrode layer 1061 may comprise a plurality of first electrodes (not shown), and the second electrode layer 1063 may comprise a plurality of second electrodes (not shown). In which, the first electrodes may receive the first voltage signal provided by the control unit 104, and the second electrodes may receive the second voltage signal provided by the control unit 104.

In another example embodiment, as shown in FIG. 3, the touch unit 300 may comprise a single electrode layer 1064. The electrode layer 1064 may comprise a plurality of first electrodes 1065 and a plurality of second electrodes 1066 disposed in a same layer (i.e., the electrode layer 1064). In the electrode layer 1064, the first electrodes 1065 and the second electrodes 1066 may be arranged in a matrix, for example. In which, the first electrodes 1065 may receive the first voltage signal provided by the control unit 104, and the second electrodes 1066 may receive the second voltage signal provided by the control unit 104.

Then, the touch unit 300 as shown in FIG. 3 is taken as an example to describe in detail how the electrostatic force is generated. When a user touches the display apparatus 100 by, for example, a finger, the control unit 104 may determine a touched object according to the touch position of the user, and generate a first voltage signal and a second voltage signal based on attribute information of the touched object to provide them to the first electrode 1065 and the second electrode 1066 at the touch position. Thus, an induced capacitance may be generated at an overlapped region between the finger and the first electrode 1065, the second electrode 1066, and an electrostatic force acting on the finger is also generated, so that the user acquires a tactile sense to the touched object. Thus, when the user's finger or other part of the human body touches the display apparatus 100, the finger or other part of the human body may be acted on by the electrostatic force, so as to acquire a tactile sense. In addition, when the user's finger slides, the area of the overlapped region between the finger and the first electrode 1065, the second electrode 1066 is changed, thus the electrostatic force may also change.

In this embodiment, the control unit 104 may provide different first voltage signals and second voltage signals for different touched objects. Since different voltage signals may be matched with different electrostatic forces, different electrostatic forces correspond to different tactile senses, the user may feel touching different objects (such as cashmere, flax, rocks, etc.).

The tactile senses may include those of touching objects made of various materials, e.g., tactile senses of touching different types of objects such as animals, rocks, water flows and cloths. The tactile senses of touching various types of objects may be subdivided. For example, the tactile senses of touching animals may include those of touching shorthair cats, longhair cats, dogs, lambs, birds, etc.; and the tactile senses of touching cloths may include those of touching pure cottons, flax, cashmere, etc. The objects displayed in the display unit may further comprise virtual keys such as OK, Delete, Add and Open. In that case, the tactile senses of touching the objects comprise the physical responses of the physical keys corresponding to the virtual keys. Further, the correspondence relations between the tactile senses and the voltage signals can be obtained through the test analyses.

In addition, according to the embodiment of the present disclosure, the display apparatus 100 as shown in FIG. 1 may further comprise a storage unit (not shown). The storage unit is configured to store attribute information of various objects and a corresponding voltage signals in association.

Figure 4:
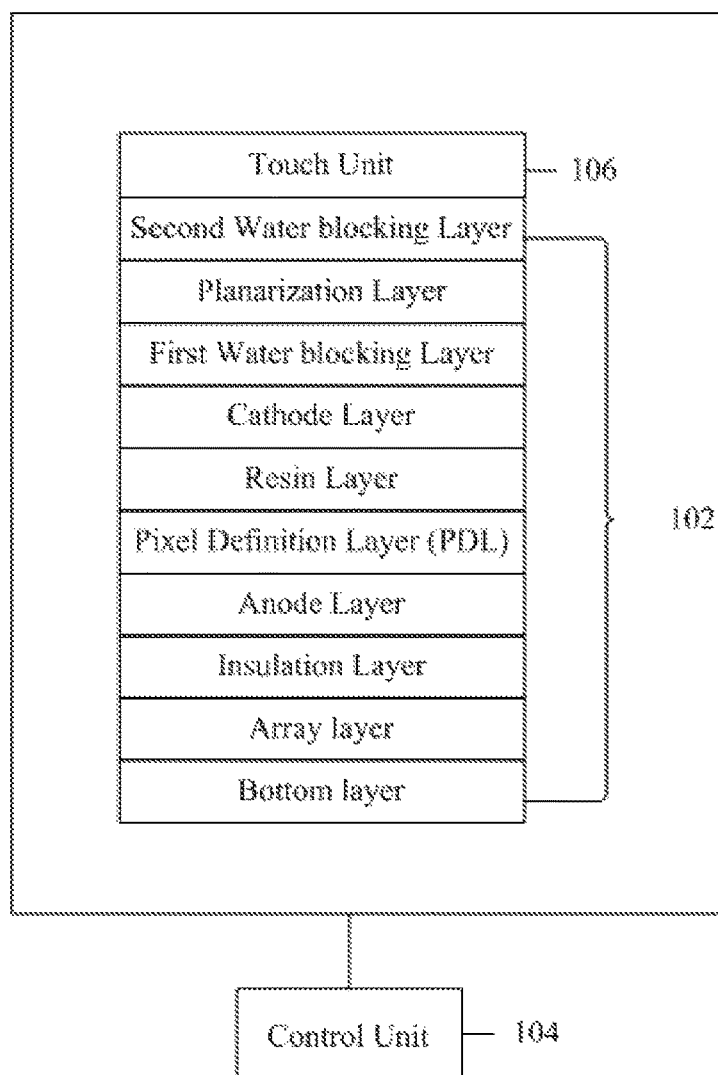
FIG. 4 shows a structure diagram of a display apparatus according to an embodiment of the present disclosure.

FIG. 4 shows a structure diagram of a display apparatus 400 according to an embodiment of the present disclosure. As shown in FIG. 4, the display apparatus 400 comprises a display unit 102, a control unit 104 and a touch unit 106. The display unit 102 may comprise a bottom layer, an array layer, an insulation (such as resin) layer, an anode layer, a pixel definition layer (PDL), a resin layer, a cathode layer and a thin film encapsulation layer. The thin film encapsulation layer further comprises a first water blocking layer, a planarization layer and a second water blocking layer. The touch unit 106 may be disposed on the thin film encapsulation layer of the display unit 102, i.e., the touch unit 106 is disposed on the second water blocking layer of the thin film encapsulation layer. The display apparatus 400 may further comprise a polarizer (not shown) disposed on the touch unit 106.

Figure 5:
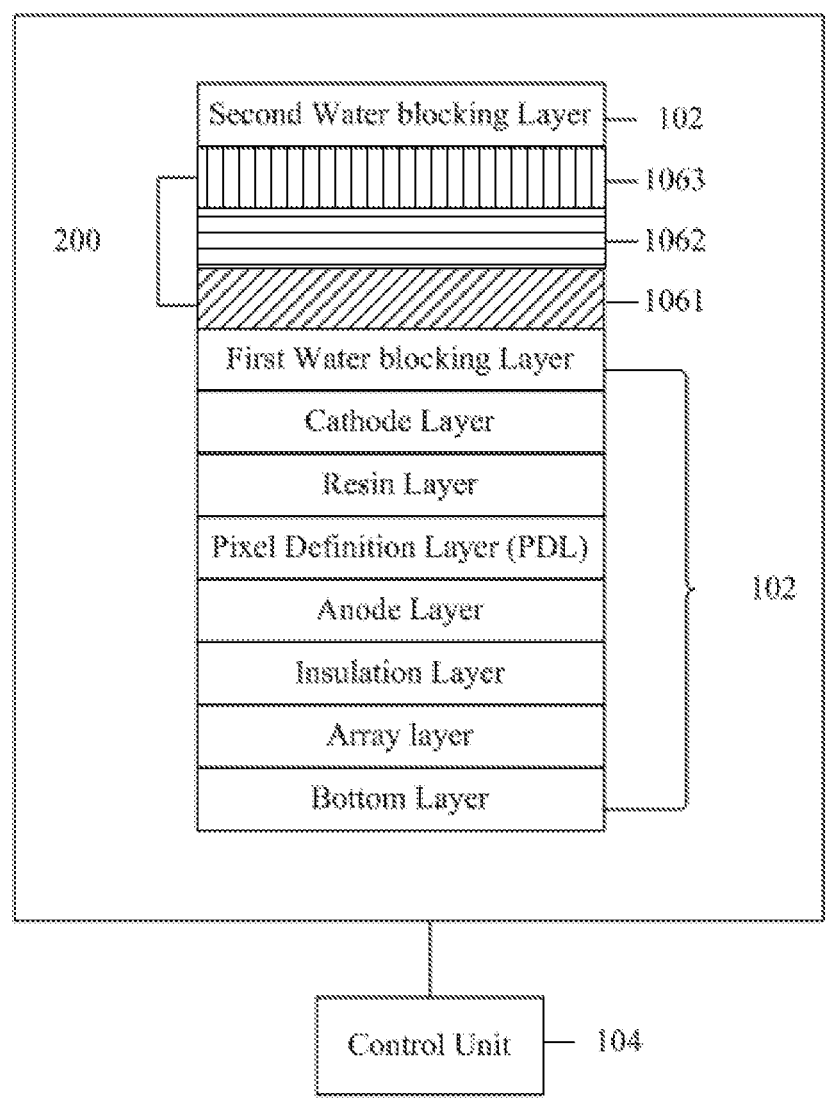
FIG. 5 shows a structure diagram of a display apparatus according to another embodiment of the present disclosure.

FIG. 5 shows a structure diagram of a display apparatus 500 according to another embodiment of the present disclosure. As shown in FIG. 5, the display apparatus 500 comprises a display unit 102, a control unit 104 and a touch unit 106. As described above, the display unit 102 may comprise a bottom layer, an array layer, an insulation (such as resin) layer, an anode layer, a pixel definition layer (PDL), a resin layer, a cathode layer and a thin film encapsulation layer. The thin film encapsulation layer further comprises a first water blocking layer, a planarization layer and a second water blocking layer. The touch unit 200 may be disposed in the thin film encapsulation layer of the display unit 102. In an example embodiment, the touch unit 200 comprises a first electrode layer 1061, a second electrode layer 1063 and an insulation layer 1062 disposed between a first electrode layer 1061 and a second electrode layer 1063 as shown in FIG. 2. Specifically, the first electrode layer 1061 may be disposed on the first water blocking layer of the thin film encapsulation layer in a manner such as printing. The insulation layer 1062 is disposed on the first electrode layer 1061 in a manner such as printing or chemical vapor deposition. The second electrode layer 1063 is disposed on the insulation layer 1062 in a manner such as printing. The second water blocking layer of the thin film encapsulation layer is disposed on the second electrode layer 1063 in a manner such as printing. In which, the insulation layer 1062 may be the planarization layer of the thin film encapsulation layer. Since the planarization layer is the insulation layer of the touch unit 200, the thickness of the display apparatus 500 is reduced. Since the touch unit 200 is disposed in the thin film encapsulation layer of the display unit 102, the bonding and strengthening processes are reduced, thus the process cost is decreased.

It should be noted that the touch unit 200 and the touch unit 300 may be disposed on or in the thin film encapsulation layer according to the manufacturing process of the display unit 102 known in the art. In addition, the disposing of the touch unit 200 and the touch unit 300 may be adjusted upon the actual demand according to the constitutions of the display apparatuses 400 and 500 and the adjustment of the processes.

The display apparatus according to the embodiment of the present disclosure may be disposed on mobile terminals such as mobile phone, tablet PC and notebook computer, etc., on wearable devices such as smart watch and virtual reality device, etc., and on terminal devices such as automatic vending machine and self-service console, etc.

It can be seen from the above description that the display apparatus provided by the embodiments of the present disclosure may generate the required electrostatic force at the touch position of the user based on the attribute information of the touched object. Thus, a user can acquire the tactile sense of the object at the touch position, thereby improving the user experiences in using the terminal device.

Figure 6:
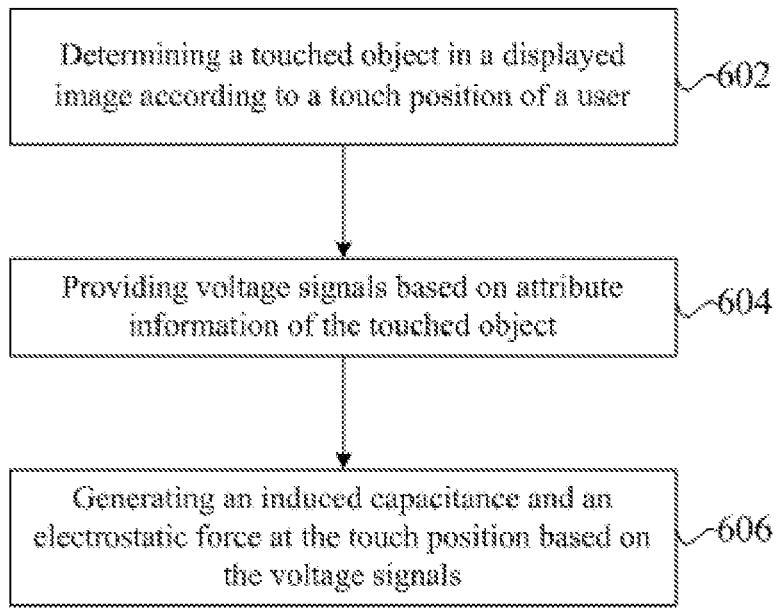
FIG. 6 shows a flow diagram of a method for implementing a touch feedback according to an embodiment of the present disclosure.
Figure 7:
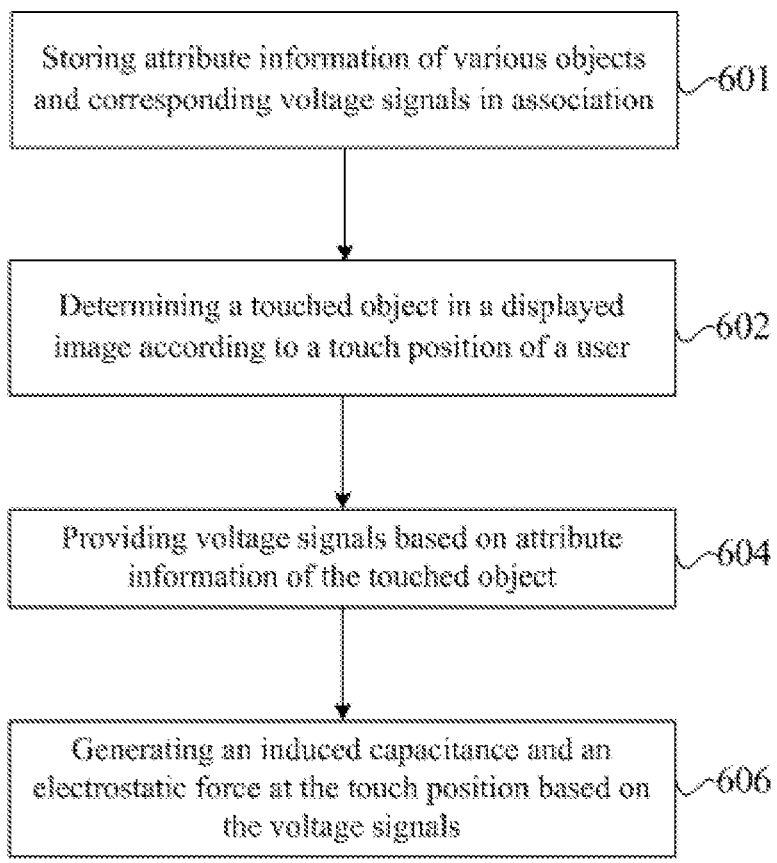
FIG. 7 shows a flow diagram of a method for implementing a touch feedback according to another embodiment of the present disclosure.

FIGS. 6 and 7 show flow diagrams of a method for implementing a touch feedback according to the embodiments of the present disclosure. In the embodiments of the present disclosure, the method may be executed by the display apparatus 100 as shown in FIG. 1. The flow diagrams as shown in FIGS. 6 and 7 are described in details as follows.

As shown in FIG. 6, in step 602, a control unit may determine a touched object in a displayed image according to the touch position of the user. In the embodiment of the present disclosure, when an image is displayed in a display unit, the control unit may recognize each object in the displayed image, and acquire a position of each object. The recognition of the object can be realized through the existed image recognition techniques. When a user touches the display apparatus, the control unit may acquire the touch position of the user, and determine the touched object according to the touch position.

In step 604, the control unit may provide a voltage signal based on attribute information of the touched object. In the embodiment of the present disclosure, the voltage signal may comprise a first voltage signal and a second voltage signal, which for example may be difference frequency voltage signals. When touching a real object, the user can acquire a tactile sense from at least one of hardness and roughness of the object. Therefore, the attribute information may comprise at least one of hardness and roughness of the object.

In step 606, a touch unit may generate an induced capacitance and an electrostatic force at the touch position based on the voltage signal. In the embodiment of the present disclosure, When the user touches the display apparatus by, for example, a finger, an induced capacitance may be generated at an overlapped region between the finger and the touch unit, and an electrostatic force acting on the finger is also generated, so that the user acquires a tactile sense to the touched object. In this embodiment, the control unit may provide different voltage signals for different touched objects. Since different voltage signals may be matched with different electrostatic forces, different electrostatic forces correspond to different tactile senses, the user may feel touching different objects (such as cashmere, flax, rocks, etc.).

As shown in FIG. 7, a flow diagram of a method for implementing a touch feedback further comprises step 601 in addition to steps 602, 604 and 606 in FIG. 6, wherein step 601 may be performed before step 602. Steps 602, 604 and 606 in FIG. 7 are the same as those in FIG. 6, and will not be repeated herein.

In step 601, attribute information of various objects and corresponding voltage signals are stored in association. In the embodiment of the present disclosure, attribute information of various objects and corresponding voltage signals may be pre-stored in a storage unit, so that a voltage signal corresponding to attribute information of a touched object can be acquired from the storage unit.

A person skilled in the art will appreciate that all or a part of the steps in the above method can be completed by instructing relevant hardware (such as a processor) through a program. The program may be stored in a computer readable storage medium, such as a read-only memory (ROM), a magnetic disk or an optical disk. Optionally, all or a part of the steps in the above embodiments may also be carried out with one or more integrated circuits. Correspondingly, each module/unit in the above embodiments may be implemented in a form of hardware (e.g., corresponding function is implemented by an integrated circuit), or a form of a software functional module (e.g., corresponding function is implemented by performing a program/instruction stored in a memory by a processor). The present disclosure is not limited to the combination of hardware and software in any particular form.

Although the embodiments of the present disclosure are described as above, they are just used to help understanding the present disclosure, rather than limiting the present disclosure. A person skilled in the art can make any amendment or change to the implementation forms and details without deviating from the spirit and scope of the present disclosure, and the patent protection scope of the present disclosure is still determined by the appended claims.

What is claimed is:

1. A display apparatus, comprising:
   a display unit configured to display an image;
   a control unit configured to determine a touched object in the image according to a touch position of a user, and provide voltage signals based on attribute information of the touched object, the attribute information including hardness and/or roughness of the touched object; and
   a touch unit configured to generate an induced capacitance and an electrostatic force at the touch position based on the voltage signals from the control unit to provide tactile senses of the touched object corresponding to the attribute information; and
   a storage unit configured to store attribute information of an object and a corresponding voltage signal, in association;
   wherein the control unit is further configured to acquire a voltage signal corresponding to the determined touched object from the storage unit,
   wherein the touch unit includes a first electrode layer having a plurality of first electrodes, a second electrode layer having a plurality of second electrodes, and an insulation layer disposed between the first electrode layer and the second electrode layer, or
   wherein the touch unit includes a plurality of first electrodes and a plurality of second electrodes disposed in the same layer,
   wherein the touch unit is disposed in a thin film encapsulation layer of the display unit.

2. The display apparatus according to claim 1, wherein the display unit is an organic light emitting diode display unit.

3. The display apparatus according to claim 1, wherein the first electrode layer is disposed on a first water blocking layer of the thin film encapsulation layer, wherein the insulation layer is disposed on the first electrode layer, wherein the second electrode layer is disposed on the insulation layer, wherein a second water blocking layer of the thin film encapsulation layer is disposed on the second electrode layer, and wherein the insulation layer is a planarization layer of the thin film encapsulation layer.

4. The display apparatus according to claim 1, wherein voltage signals comprise a first voltage signal provided to the first electrodes in the touch unit, and a second voltage signal provided to the second electrodes in the touch unit.

5. The display apparatus according to claim 4, wherein the touch unit is configured to generate the induced capacitance and the electrostatic force based on the first voltage signal and the second voltage signal at the touch position.

6. A method for implementing a touch feedback in the display apparatus according to claim 1, the method comprising:
   determining a touched object in a displayed image according to a touch position of a user;
   providing voltage signals based on attribute information of the touched object; and
   generating an induced capacitance and an electrostatic force at the touch position based on the voltage signals.

7. The method according to claim 6, wherein the voltage signals comprise a first voltage signal and a second voltage signal.

8. The method according to claim 6, further comprising storing attribute information of an object and a corresponding voltage signal.

\* \* \* \* \*